Oct. 23, 1951     W. A. HANSEN     2,572,616
FISH LURE HOOK UP
Filed June 15, 1950
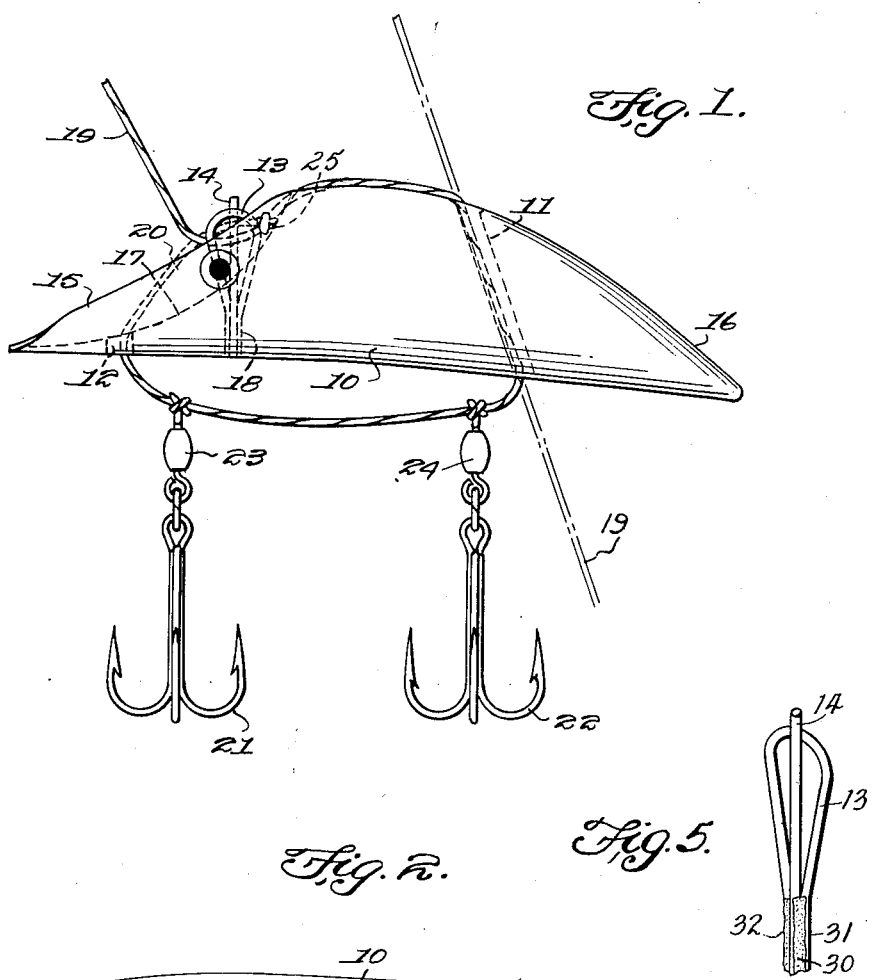
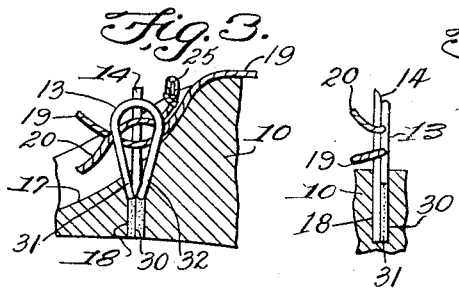
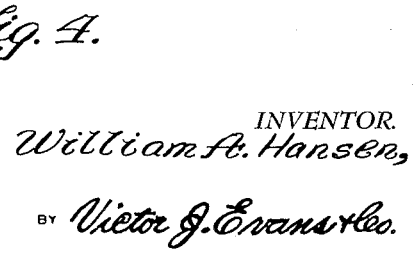
INVENTOR.
*William A. Hansen,*
BY *Victor J. Evans & Co.*
ATTORNEYS Patented Oct. 23, 1951

2,572,616

UNITED STATES PATENT OFFICE 2,572,616

FISH LURE HOOK UP

William A. Hansen, Seattle, Wash.

Application June 15, 1950, Serial No. 168,358

2 Claims. (Cl. 43—42.05)

This invention relates to fish lures commonly known as plugs, and in particular a wooden plug formed to resemble a fish with vertically disposed openings through the forward end and mid section and with a spring line fastening element positioned in the upper surface of the forward end.

The purpose of this invention is to provide a fish lure in which hooks are suspended from the lure by the fishing line and when a fish strikes the hooks are released from the lure whereby the lure floats upwardly on the line so that the lure immediately leaves the hook enabling freedom in playing and landing the fish.

Various methods have been provided for attaching fishing lines and hooks to lures such as plugs and the like but in the conventional plug or lure the hook is fast to the plug or body of the lure and when a fish strikes the plug interferes with playing and landing the fish. With this thought in mind this invention contemplates a lure having a buoyant body with an opening therethrough and with the line extended through the opening whereby the lure may float upwardly along the line when released from the hook.

The object of this invention is, therefore, to provide means for attaching a fishing line to a lure or plug whereby hooks attached to the line are released from the plug as soon as a fish strikes and whereby the lure is free to float upwardly along the line after being released therefrom.

Another object of the invention is to provide a fish lure in which the line extends through an opening through the body of the lure and is releasably attached thereto in which the parts may readily be reset for use after catching a fish.

A further object of the invention is to provide a fishing lure in which the body of the lure is detached from the hooks when a fish strikes and wherein the line extends through openings through the lure which is of a simple and economical construction.

With these and other objects and advantages in view the invention embodies a lure having a plug-like wood body with a diagonally disposed vertically positioned opening extended through the rear portion thereof, with another opening through the head and with a line holding spring clip positioned on the upper surface of the forward end.

Other features and advantages of the invention will appear from the following description taken in connection with the drawings wherein:

Figure 1 is a side elevation view illustrating the improved fish lure showing the ends of the fishing line secured in the spring clip with parts in the positions in which they are used for fishing.

Figure 2 is a plan view of the lure.

Figure 3 is a detail showing a section through the forward part of the lure on the line 3—3 of Figure 2 illustrating the spring clip for retaining the line in the fishing position.

Figure 4 is a cross section taken on the line 4—4 of Figure 2 at a right angle to that shown in Figure 3 illustrating the spring clip, and showing the clip in elevation.

Figure 5 is a perspective view of the spring clip.

Referring now to the drawings wherein like reference characters denote corresponding parts the improved fish lure hook up of this invention includes a wood body 10 having a diagonally disposed vertically positioned opening 11 in the rear portion thereof, a vertically disposed opening 12 extended through the head and a substantially U-shaped spring clip 13 having a finger 14 soldered as at 30 to the ends of the legs 31 and 32 of the clip 13 and the clip 13 and finger 14 are used for resiliently holding a portion of a fishing line extended through the plug and also the end of the line.

In the design shown the plug 10 is provided with a head portion 15 and a tail portion 16 and, as illustrated in Figures 1 and 2 the head portion is provided with a dished out or concave surface 17 and the spring clip 13 is positioned in a rear portion of the concave surface with the lower ends of the parts thereof cemented in an opening 18 as illustrated in Figures 3 and 4.

With the parts arranged in this manner the main section of a fishing line 19 is placed between the spring finger 14 and the clip 13 and from the clip the line extends over the upper surface of the body 10, passing downwardly through the opening 11 and forwardly from the lower end portion of the opening 11 to the opening 12 and the end portion 20 of the line which extends through the opening 12 is secured in the spring clip 13 above the main section of the line.

With the end portion 20 of the fishing line placed in the spring clip after the main section of the line is in place the end will be drawn out first thereby releasing the plug from the line and as the main part of the line is pulled from the spring clip the plug is free to float upwardly with the line extended through the opening 11.

The fishing line is provided with a pair of gang hooks 21 and 22 and the hooks are suspended from the line by swivel joints 23 and 24, respectively.

The fishing lure or plug is illustrated in the position in which it is used for fishing in Figure 1 wherein the main portion of the line is placed through the spring clip 13 and the end portion 20 which is provided with a knot 25 is placed over the former section and also extended through the spring clip. The pull of the line is, therefore, directly upon the spring clip and the plug is drawn through the water or floats thereon in the usual manner. As a fish strikes the plug the hooks pull on the line releasing the end portion 20 whereby the line may be drawn downwardly through the opening 11 in the plug body and this action releases the line from the spring clip whereby the line 19 assumes the position illustrated by the dotted lines shown in Figure 1. The float is then free to float upwardly along the line so that the line may be used for playing and landing the fish without interference by the plug or lure. After a fish is removed from the line the end portion of the line may be drawn through the opening 12 and replaced in the spring clip after the main portion of the line is inserted therein.

It will be understood that modifications may be made in the design and arrangement of the parts without departing from the spirit of the invention.

What is claimed is:

1. A fishing lure comprising a buoyant body having a vertically disposed line receiving opening through the rear portion and a similar vertically disposed opening through the forward end, and a spring clip positioned on the upper surface of the body and spaced rearwardly from the opening through the forward end of the body, said spring clip being positioned to receive a portion of a fishing line with the end of the line extended from the spring clip over the upper surface of the body through the opening in the rear portion of the body, forwardly under the body, upwardly through the opening through the head of the body and secured in the said spring clip, said line having fish hooks thereon positioned between the opening through the rear portion of the body and opening through the forward end of the body.

2. A fishing lure comprising a buoyant body having a vertically disposed line receiving opening through the rear portion and a similar vertically disposed opening through the forward end, and a spring clip positioned on the upper surface of the body and spaced rearwardly from the opening through the forward end of the body, said spring clip being positioned to receive a portion of a fishing line with the end of the line extended from the spring clip over the upper surface of the body through the opening in the rear portion of the body, forwardly under the body, upwardly through the opening through the head of the body and secured in the said spring clip, said line having fish hooks thereon positioned between the opening through the rear portion of the body and opening through the forward end of the body, and said body having a concave recess in the upper surface and positioned at the forward end and in which the said spring clip is positioned.

WILLIAM A. HANSEN.

REFERENCES CITED

The following references are of record in the file of this patent:

UNITED STATES PATENTS

| Number | Name | Date |
| --- | --- | --- |
| 1,390,458 | Moree | Sept. 13, 1921 |
| 2,165,071 | Saarela | July 4, 1939 |
| 2,181,254 | Wilson | Nov. 28, 1939 |
| 2,236,353 | Minser | Mar. 25, 1941 |
| 2,256,173 | Schechterle | Sept. 16, 1941 |